(12) United States Patent
Perlman et al.

(10) Patent No.: US 6,386,786 B1
(45) Date of Patent: May 14, 2002

(54) ROTATING CLAMP

(75) Inventors: Maurice Perlman, Oak Park; Don Hufford, Farmington Hills, both of MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/544,895

(22) Filed: Apr. 7, 2000

(51) Int. Cl.⁷ .................................................. F16C 11/06
(52) U.S. Cl. ........................ 403/90; 403/374.2; 248/540
(58) Field of Search ............................ 403/56, 90, 122, 403/373, 374.2, DIG. 9; 248/540, 316.1, 229.1, 229.2

(56) References Cited

U.S. PATENT DOCUMENTS

| | | |
|---|---|---|
| 1,551,323 A | 8/1925 | Offerdahl |
| 2,640,391 A | 6/1953 | Moseley |
| 2,841,427 A | 7/1958 | Sheppard |
| 3,385,545 A * | 5/1968 | Patton ................ 248/229.1 X |
| 4,138,198 A | 2/1979 | Brown |
| 4,382,572 A | 5/1983 | Thompson |
| 4,473,240 A | 9/1984 | Sanada |
| 4,508,296 A | 4/1985 | Clark |
| 4,515,336 A | 5/1985 | Fischer |
| 4,898,490 A | 2/1990 | Herbermann et al. |
| 5,383,738 A | 1/1995 | Herbermann |
| 5,393,161 A | 2/1995 | Mata et al. |
| 5,405,113 A * | 4/1995 | Jaw ..................... 248/229.1 X |
| 5,833,383 A | 11/1998 | Bauman |
| 5,921,694 A | 7/1999 | Herbermann |

OTHER PUBLICATIONS

Exhibit A comprises a series of three photographs of a clamp manufactured by the Atlas Corporation prior to the invention date of this application.
Exhibit B comprises a series of two photographs of a clamp manufactured by the ISI Corporation prior to the invention date of this application.

* cited by examiner

*Primary Examiner*—Lynne H. Browne
*Assistant Examiner*—John R. Cottingham
(74) *Attorney, Agent, or Firm*—Van Dyke, Gardner, Linn & Burkhart, LLP

(57) ABSTRACT

A clamp that is particularly suitable for automated manufacturing or assembly environments, such as on a transfer press, includes a first and a second clamp which engage each other via a joint. The joint is adapted to allow the first and second clamps to both pivot and rotate with respect to each other. A third clamp fits over the joint and selectively secures the first and second clamps in a desired orientation when the third clamp is tightened. The joint may be a ball and socket joint.

22 Claims, 4 Drawing Sheets

ROTATING CLAMP

BACKGROUND OF THE INVENTION

This invention relates generally to clamping devices used to secure two parts together in a fixed spatial relationship.

In today's automated manufacturing and assembly environment, it is customary to use tools that have to be connected together in certain spatial relationships. For example, the use of transfer presses in automated manufacturing or assembly environments often requires that certain tools be mounted to the transfer press at specific positions and orientations. The transfer press includes a movable rail to which various tools are attached. These tools can include suction cups, grippers, or other types of tools used to handle and move the parts being assembled or manufactured. In order for the tools to pick up and move the parts being manipulated, it is necessary for them to be arranged in a manner corresponding to the particular shape of the part being manipulated. Thus, it is often necessary to have the tools adjustably clamped to the transfer press rail. The adjustability of the clamping allows the tools to be attached in such a way that they are properly positioned for picking up and manipulating the part undergoing manufacture or assembly.

In the past, the clamps used in automated manufacturing and assembly environments have suffered from the disadvantage of having a limited degree of adjustability. For example, some prior art clamps have allowed two parts to be rotatably clamped together, but do not allow the parts to be swiveled with respect to each other. In other prior art clamps, parts can be swiveled with respect to each other, but not rotated. These prior art clamps therefore limit the range of movement of one part with respect to another when they are clamped together. These types of clamps therefore may render it difficult to achieve the necessary configuration of tools, and may further necessitate the use of additional clamps in order to achieve such a configuration. The need for a clamp that provides greater adjustability can therefore be seen.

SUMMARY OF THE INVENTION

Accordingly, the present invention provides a clamp which has an increased level of adjustability. Specifically, the clamp allows for both the rotation and swiveling of the two parts that are clamped together.

In one embodiment, the invention comprises a swivel clamp for securing together a first and second part. The swivel clamp includes a first clamp having an opening for receiving and selectively securing the first part to the first clamp. The swivel clamp further includes a second clamp defining an opening for receiving and selectively securing the second part to the second clamp. A socket is attached to the first clamp, while a ball is attached to the second clamp. The ball is dimensioned to fit partially within the socket such that the ball can rotate within the socket. A third clamp is further positioned around the ball and socket and adapted to be selectively tightened against the first and second clamps such that the socket is prevented from rotating around the ball when the third clamp is tightened. The first and second clamps can thereby be swiveled and rotated with respect to each other.

In another embodiment, the invention comprises a swivel clamp having a first clamp that defines a generally cylindrical opening for receiving a first part. The first clamp includes a top and a bottom half which define a gap therebetween. A second clamp is further included which has a generally cylindrical opening for receiving a second part. The second clamp includes a top and bottom half which defines a gap therebetween. A first fastener is provided for selectively narrowing the gap in the first clamp, while a second fastener is provided for selectively narrowing the gap in the second clamp. A joint is disclosed between the first and second clamps and adapted to allow the first and second clamps to both rotate and swivel with respect to each other. A third clamp is disposed around the joint and includes a top and a bottom that are selectively secured together by way of at least one fastener. The third clamp engages the joint and prevents the joint from rotating or swiveling when the top and bottom are tightly secured together by the at least one fastener.

The swivel clamp of the present invention thereby provides greater adjustability by being able to both rotate and swivel. This facilitates the installation and setup of tool configurations used in automated manufacturing or assembly environments. These and other benefits, results, and objects of the present invention will be apparent to one skilled in the art, in light of the following specification when read in conjunction with the accompanying drawings.

DESCRIPTION OF THE PREFERRED EMBODIMENTS

Figure 1:
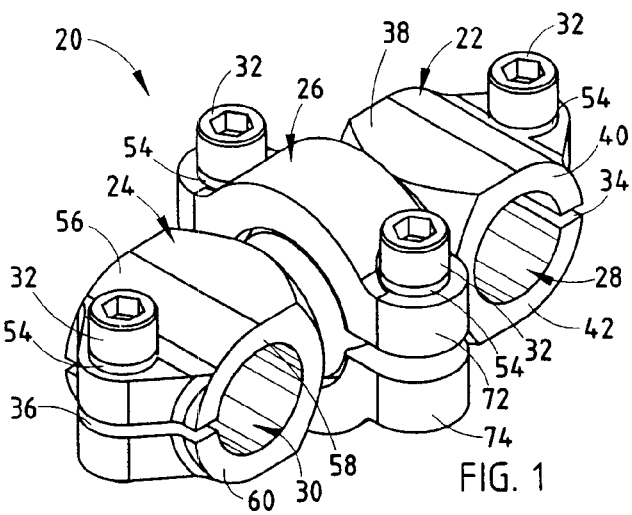
FIG. 1 is a perspective view of a swivel clamp according to a first embodiment of the present invention.
Figure 2:
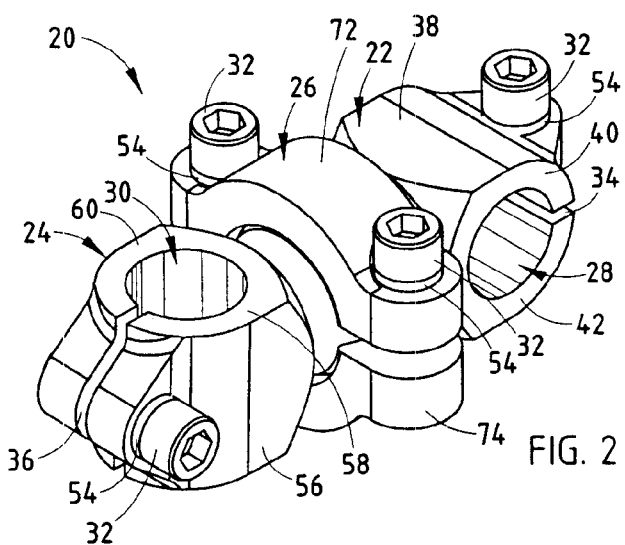
FIG. 2 is a perspective view of the swivel clamp of FIG. 1 illustrated in a rotated configuration.
Figure 3:
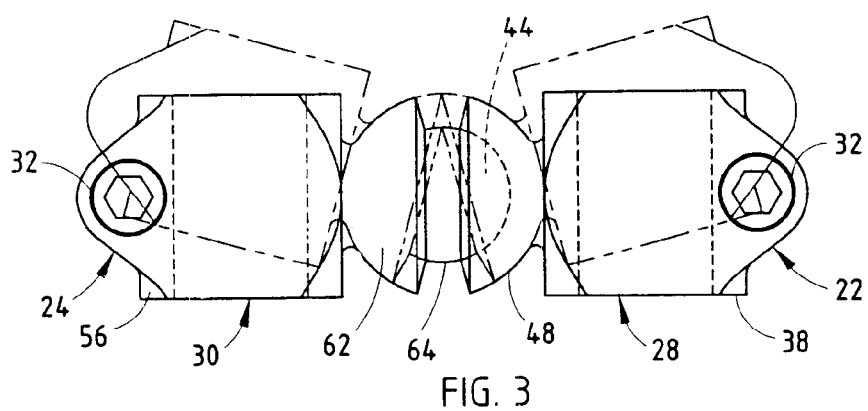
FIG. 3 is a plan view of a male and female clamp of the swivel clamp of FIG. 1 illustrated in both a straight configuration and a swivel configuration (in phantom)
Figure 4:
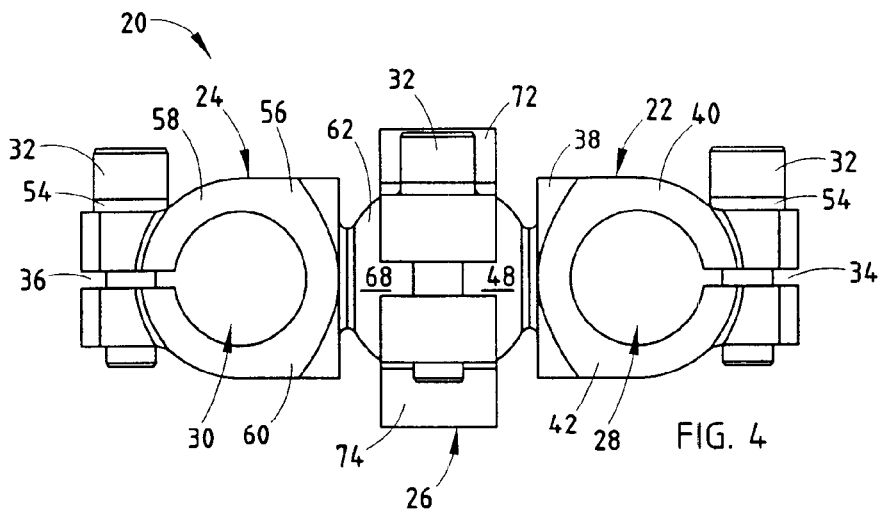
FIG. 4 is an elevational view of the swivel clamp of FIG. 1.

The present invention will now be described with reference to the accompanying drawings wherein like reference numerals correspond to like elements in the several drawings. A swivel clamp 20 according to a first embodiment of the present invention is depicted in FIGS. 1, 2, and 4 and includes a female clamp 22, male clamp 24, and a third clamp 26 disposed between male and female clamps 22 and 24. Female clamp 22 includes an opening 28 for receiving a first part to which swivel clamp 20 is secured. Male clamp 24 includes a similar opening 30 for receiving a second part to which swivel clamp 20 is secured. The first part is secured in female clamp 22 by way of a fastener 32 which selectively narrows a gap 34 defined between the upper and lower halves of female clamp 22. The second part is secured in male clamp 24 by way of a fastener 32 which likewise selectively narrows a gap 36 defined between the upper and lower halves of male clamp 24. As is illustrated in FIG. 2, female clamp 22 and male clamp 24 are rotatable with respect to each other. Further, as illustrated in FIG. 3, female clamp 22 and male clamp 24 are each pivotable with respect to each other. The combination of rotation and pivoting, or swiveling, allows swivel clamp 20 to be adjusted to clamp two different parts together in a wide variety of different orientations. When tightened, third clamp 26 secures clamp 20 in the desired orientation by gripping an exterior surface 48 of female clamp 22 and an exterior surface 68 of male clamp 24. The frictional contact between third clamp 26 and exterior surfaces 48 and 68 prevents rotation or swiveling of female and male clamps 22 and 24 with respect to each other when clamp 26 is tightened.

Figure 5:
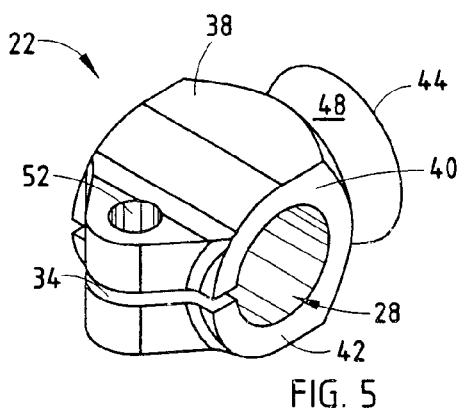
FIG. 5 is a perspective view of the female clamp of the swivel clamp of FIG. 1.
Figure 6:
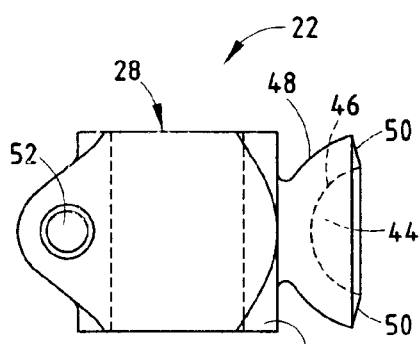
FIG. 6 is a plan view of the female clamp.
Figure 7:
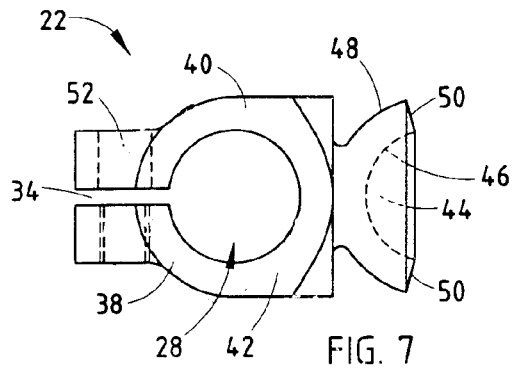
FIG. 7 is an elevational view of the female clamp.

Female clamp 22 is depicted in FIGS. 5–7 and includes a body 38 having an upper half 40 and lower half 42. A socket 44 is defined at one end of female clamp 22. Socket 44 includes an interior, spheroidal surface 46 which receives a ball 64 as will be discussed in more detail herein. Socket 44 further includes an exterior surface 48 that is generally hemispherical shaped. Exterior surface 48 encompasses slightly less than a full hemisphere in order to allow swiveling of female clamp 22 with respect to male clamp 24, as discussed in more detail herein. Exterior surface 48 and interior surface 46 are connected by an end surface 50 which is angled away from male clamp 24 (FIGS. 6–7). Socket 44 is generally rigid and thus does not compress—or compresses minimally, if at all—when third clamp 26 is tightened. The tightening of third clamp 26 retains the entire clamp 20 in the desired orientation through the frictional contact of surfaces 48 and 68 with third clamp 26, rather than through any compression of socket 44 onto ball 64. Socket 44 thus does not need to be flexible and does not undergo the fatigue associated with flexible sockets that repeatedly undergo deforming contractions.

Upper half 40 and lower half 42 together define a generally cylindrical opening 28 into which a first part is inserted for attachment to swivel clamp 20. Upper half 40 and lower half 42 are integrally joined along one end of female clamp 22. Specifically, they are integrally joined along an end of female clamp 22 adjacent socket 44. At the opposite end, upper half 40 and lower half 42 define a gap 34 which can be flexibly narrowed by the use of a fastener 32. Fastener 32 fits into an aperture 52 defined in upper and lower halves 40 and 42. The portion of aperture 52 defined in lower half 42 is internally threaded for engagement with threaded fastener 32. The portion of aperture 52 defined in upper half 40 is smooth and not threaded. By inserting a threaded fastener 32 into aperture 52, the head of the threaded fastener pushes against upper half 40 when the fastener is rotated into aperture 52. The continued rotation causes upper half 40 to be pushed downward toward lower half 42, thereby narrowing gap 34. The narrowing of gap 34 causes upper half 40 and lower half 42 to tightly grip the first part that is inserted into opening 28 of female clamp 22. In the current embodiment, the fastening of female clamp 22 to a first part is facilitated by use of a lock washer 54 (see FIG. 4).

Figure 8:
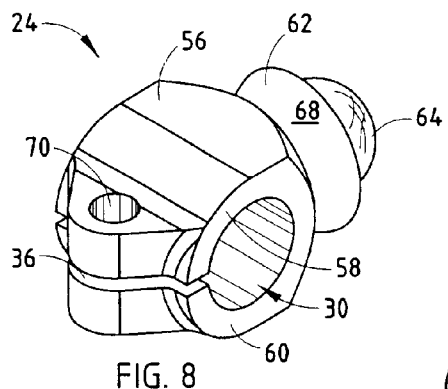
FIG. 8 is a perspective view of the male clamp of the swivel clamp of FIG. 1.
Figure 9:
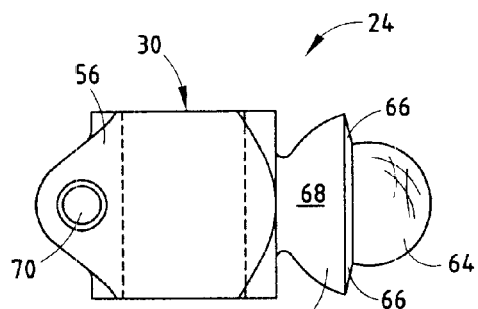
FIG. 9 is a plan view of the male clamp.
Figure 10:
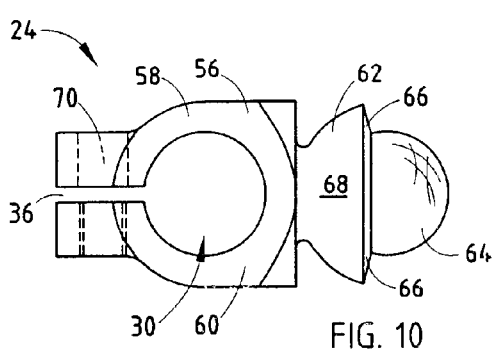
FIG. 10 is an elevational view of the male clamp.
Figure 10:
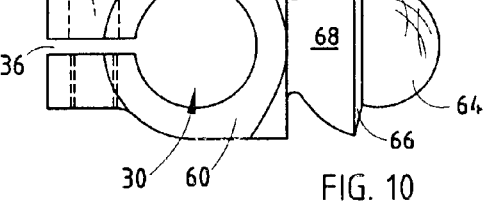

Male clamp 24 is depicted in FIGS. 8–10 and includes a body 56 having an upper half 58 and lower half 60. Body 56 further includes a generally hemispherical protrusion 62 which extends outwardly and is integrally joined with a ball 64. Ball 64 is spherically shaped and has a diameter less than that of hemispherical protrusion 62. The curvature of interior, spherical surface 46 of socket 44 matches the curvature of the exterior surface of ball 64. Socket 44 is thereby able to both pivot and rotate along the exterior surface of ball 64. An end surface 66 is defined between ball 64 and an exterior surface 68 of hemispherical protrusion 62. End surface 66 of male clamp 24 contacts end surface 50 of female clamp 22 when male and female clamps are swiveled with respect to each other. End surfaces 66 and 50 thereby limit the extent of pivoting of female and male clamps 22 and 24 with respect to each other.

Upper and lower halves 58 and 60 of male clamp 24 define a generally cylindrical opening 30 into which a second part is inserted and secured. The second part is secured in an opening 30 in the same manner that a first part is secured in opening 28 of female clamp 22. In particular, a fastener 32 is inserted through an aperture 70 defined in upper and lower halves 58 and 60. Aperture 70 defined in lower half 60 is internally threaded and threadingly engages the exterior threads defined on fastener 32. By rotating threaded fastener 32, the gap 36 between upper and lower halves 58 and 60 can be decreased, thereby clamping the second part in opening 30. In the current embodiment, a lock washer 54 is also used with male clamp 24. The lock washer 54 is positioned between the head of fastener 32 and upper half 58 of male clamp 24. Lock washer 54 helps insure a tight clamping of the second part which is inserted into opening 30.

Figure 11:
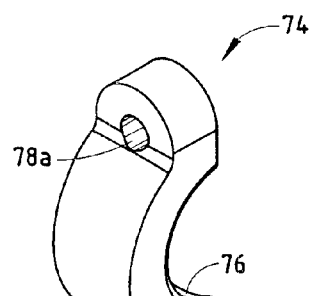
FIG. 11 is a perspective view of a first half of a third clamp.
Figure 12:
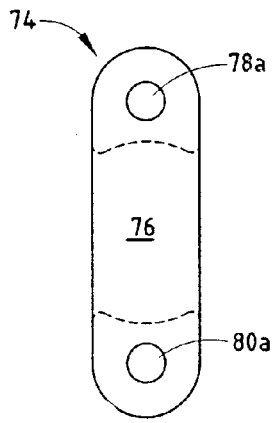
FIG. 12 is a plan view of the first half of the third clamp.
Figure 13:
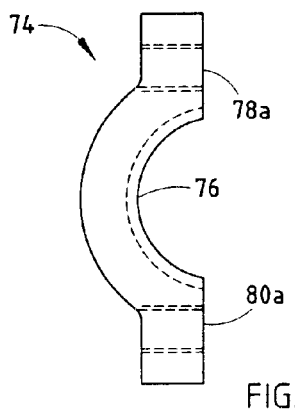
FIG. 13 is a side, elevational view of the first half of the third clamp.
Figure 14:
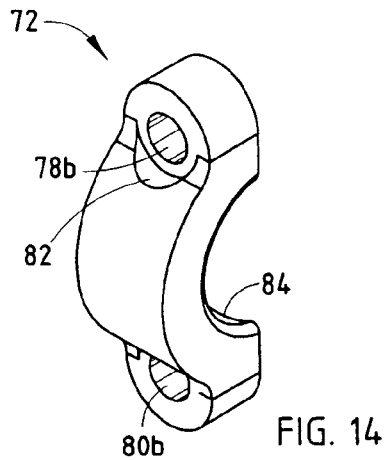
FIG. 14 is a perspective view of a second half of the third clamp.
Figure 15:
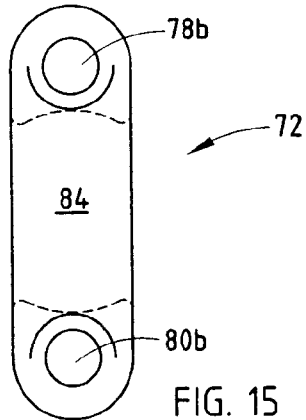
FIG. 15 is a plan view of the second half of the third clamp.
Figure 16:
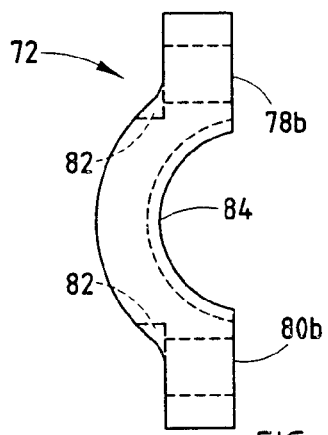
FIG. 16 is a side, elevational view of the second half of the third clamp.

The relative orientation of female clamp 22 with respect to male clamp 24 is selectively fixed by way of third clamp 26. Third clamp 26 includes a top 72 and bottom 74 which fit around the ball and socket joint defined between the bodies of female clamp 22 and male clamp 24. Top 72 is depicted in FIGS. 14–16, while bottom 74 is depicted in FIGS. 11–13. Bottom 74 includes an interior curved surface 76 that matches the curvature of exterior surfaces 68 and 48 of male and female clamps 24 and 22, respectively. Bottom 74 further includes a first aperture 78a and second aperture 80a. Second aperture 80a is defined at an end of bottom 74 opposite first aperture 78a. First and second apertures 78a and 80a are threaded and receive a threaded fastener, such as fastener 32. Threaded fasteners 32 are used to secure top and bottom 72 and 74 together, along with controlling the tightness to which top and bottom 72 and 74 are secured together.

Top 72 of third clamp 26 includes a first aperture 78b and a second aperture 80b. Apertures 78b and 80b correspond to apertures 78a and 80a defined in bottom 74. First and second apertures 78b and 80b are not threaded. A recess 82 is defined adjacent first and second apertures 78b and 80b on the top side of top 72. Recesses 82 are provided to accommodate the head of the screw 32 used to secure top 72 and bottom 74 together. Top 72 also includes an interior curved surface 84 that has a curvature which matches the curvature of exterior surfaces 68 and 48 of male clamp 24 and female clamp 22, respectively. By rotating screws 32 in apertures 78 and 80, top and bottom 72 and 74 are compressed together. This compression causes interior curved surface 84 of top 72 and interior curved surface 76 of bottom 74 to tightly grip the exterior surfaces 68 and 48 of male and female clamps 24 and 22. The gripping of exterior surfaces 68 and 48 prevents female clamp 22 and male clamp 24 from rotating or swiveling with respect to each other. The orientation of male clamp 24 and female clamp 22 is thus first set to the desired orientation, and then screws 32 are tightened in apertures 78 and 80, to thereby secure swivel clamp 20 in the desired orientation.

Figure 17:
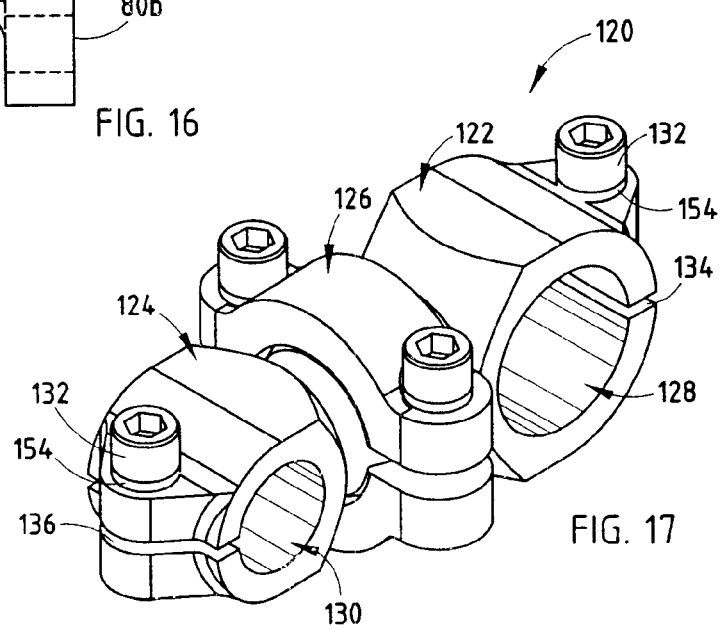
FIG. 17 is a perspective view of a swivel clamp according to a second embodiment of the present invention.

An alternative embodiment of a swivel clamp 120 is depicted in FIG. 17 wherein elements corresponding to swivel clamp 20 are depicted with like numbers increased by one hundred. Swivel clamp 120 depicted in FIG. 17 includes male and female clamps which are of a different size. Specifically, the female clamp 122 has a cylindrical opening 128 which is of generally greater diameter than the cylindrical opening 130 of the male clamp 124. Swivel clamp 120 allows parts of different diameters to be secured together. It will of course be understood that female clamp 122 could be modified to have a smaller cylindrical opening, while male clamp 124 could have a larger cylindrical opening.

In the current embodiment, female clamp 22, male clamp 24, and third clamp 26 are all made out of heat treated aluminum. Fasteners 32 and lock washers 54 can be made out of any suitable material. Modifications of the materials of female clamp 22, male clamp 24 and third clamp 26, can, of course, be made. The embodiments described herein, of course, can also be varied in other respects. For example, the manner by which female and male clamps 22 and 24 are affixed to the parts being clamped together can be varied. Instead of a cylindrical opening into which parts are inserted and clamps 22 and 24 are subsequently tightened, there could be a square or other shaped opening for receiving parts. Alternatively, clamps 22 and 24 could include a rod or the like to which the parts clamp themselves. Or as another alternative, a plate could be attached to clamps 22 and 24 which includes fasteners for securing a part to the plate. Various other means by which the parts can be secured to clamps 22 and 24 could also be used within the scope of the invention.

While the present invention has been described in terms of the preferred embodiments depicted in the drawings and discussed in the above-specification, it will be understood by one skilled in the art that the present invention is not limited to these particular preferred embodiments, but includes any and all such modifications that are within the spirit and scope of the present invention as defined in the appended claims.

The embodiments of the present invention in which an exclusive property or privilege is claimed are defined as follows:

1. A swivel clamp for securing together a first and second part, comprising:
   a first clamp having an attachment structure for attaching said first clamp to the first part, said first clamp adapted to selectively secure said first part to said first clamp;
   a second clamp having an attachment structure for attaching said second clamp to the second part, said second clamp adapted to selectively secure said second part to said second clamp;
   a socket attached to said first clamp;
   a ball attached to said second clamp, said ball dimensioned to fit partially within said socket such that said ball can rotate within said socket; and
   a third clamp positioned around said ball and said socket, said third clamp adapted to be selectively tightened against said first and second clamps such that said first and second clamps are prevented from rotating when said third clamp is tightened, whereby said first and said second clamps can be swiveled and rotated with respect to each other when said third clamp is not tightened.

2. The swivel clamp of claim 1 wherein said first clamp includes an upper half and a lower half and a threaded fastener which selectively moves said first half toward or away from said second half.

3. The swivel clamp of claim 2 wherein said second clamp includes an upper half and a lower half and a threaded fastener which selectively moves said first half of said second clamp toward or away from said second half of said second clamp.

4. The swivel clamp of claim 1 wherein said third clamp includes an upper half and a lower half and at least one threaded fastener which selectively moves said first half toward or away from said second half.

5. A swivel clamp for securing together a first and second part, comprising:
   a first clamp having an attachment structure for attaching said first clamp to the first part, said first clamp adapted to selectively secure said first part to said first clamp;
   a second clamp having an attachment structure for attaching said second clamp to the second part, said second clamp adapted to selectively secure said second part to said second clamp;
   a socket attached to said first clamp;
   a ball attached to said second clamp, said ball dimensioned to fit partially within said socket such that said ball can rotate within said socket;
   a third clamp positioned around said ball and said socket, said third clamp adapted to be selectively tightened against said first and second clamps such that said ball is prevented from rotating in said socket when said third clamp is tightened, whereby said first and said second clamps can be swiveled and rotated with respect to each other; and
   said second clamp further including a generally hemispherical protrusion surrounding said ball, said hemispherical protrusion contacting said third clamp when said third clamp is tightened.

6. The swivel clamp of claim 5 wherein said third clamp includes an inner, curved surface that engages said hemispherical protrusion when said third clamp is tightened.

7. The swivel clamp of claim 1 wherein said attachment structure of said first clamp is larger than said attachment structure of said second clamp.

8. The swivel clamp of claim 1 wherein said first clamp includes a top half having a first and second end and a bottom half having a first and second end, said top half and said bottom half being integrally connected at said first ends, said top and said bottom half defining a gap between said second ends, and said top and bottom halves further including at least one threaded opening for receiving a fastener to selectively narrow said gap.

9. A swivel clamp, comprising:
   a first clamp defining a generally cylindrical opening for receiving a first part, said first clamp including a top and a bottom half which define a gap therebetween;
   a second clamp defining a generally cylindrical opening for receiving a second part, said second clamp including a top and a bottom half which define a gap therebetween;
   a first fastener for selectively narrowing said gap in said first clamp;
   a second fastener for selectively narrowing said gap in said second clamp;
   a joint disposed between said first and said second clamps, said joint adapted to allow said first and said second clamps to rotate and swivel with respect to each other;

a third clamp disposed around said joint, said third clamp having a top and a bottom selectively secured together by way of at least one fastener, said third clamp engaging said joint and preventing said joint from rotating or swiveling when said at least one fastener tightly secures said top and bottom together, said joint being integrally attached to said first and second clamps such that said first and second clamps are prevented from rotating when said third clamp is tightened.

10. The swivel clamp of claim 9 wherein said joint is a ball and socket joint, said ball being attached to said first clamp and said socket being attached to said second clamp.

11. A swivel clamp, comprising:

a first clamp defining a generally cylindrical opening for receiving a first part, said first clamp including a top and a bottom half which define a gap therebetween;

a second clamp defining a generally cylindrical opening for receiving a second part, said second clamp including a top and a bottom half which define a gap therebetween;

a first fastener for selectively narrowing said gap in said first clamp;

a second fastener for selectively narrowing said gap in said second clamp;

a ball and socket joint disposed between said first and said second clamps, said ball being attached to said first clamp and said socket being attached to said second clamp, said joint adapted to allow said first and said second clamps to rotate and swivel with respect to each other; and a third clamp disposed around said joint, said third clamp having a top and a bottom selectively secured together by way of at least one fastener, said third clamp engaging said joint and preventing said joint from rotating or swiveling when said at least one fastener tightly secures said top and bottom together;

wherein said ball is partially surrounded by a generally hemispherical protrusion, said hemispherical protrusion having an exterior surface which is contacted by said third clamp when said top and bottom of said third clamp are secured together.

12. The swivel clamp of claim 10 wherein said generally cylindrical opening in said first clamp has a larger diameter than said generally cylindrical opening in said second clamp.

13. The swivel clamp of claim 10 wherein said first and said second fasteners are screws that fit into corresponding apertures defined in said first and second clamps.

14. The swivel clamp of claim 13 wherein said at least one fastener of said clamp is a screw that fits into a corresponding aperture defined in said third clamp.

15. The swivel clamp of claim 11 wherein said top and bottom of said third clamp include a curved interior surface.

16. The swivel clamp of claim 15 wherein said curved interior surface of said bottom and top of said third clamp is curved to match the exterior surface of said generally hemispherical protrusion.

17. A swivel clamp, comprising:

a first clamp defining a generally cylindrical opening for receiving a first part, said first clamp including a top and a bottom half which define a gap therebetween;

a second clamp defining a generally cylindrical opening for receiving a second part, said second clamp including a top and a bottom half which define a gap therebetween;

a first fastener for selectively narrowing said gap in said first clamp;

a second fastener for selectively narrowing said gap in said second clamp;

a ball and socket joint disposed between said first and said second clamps, said ball being attached to said first clamp and said socket being attached to said second clamp, said joint adapted to allow said first and said second clamps to rotate and swivel with respect to each other;

a third clamp disposed around said joint, said third clamp having a top and a bottom selectively secured together by way of at least one fastener, said third clamp engaging said joint and preventing said joint from rotating or swiveling when said at least one fastener tightly secures said top and bottom together;

wherein said ball and socket joint further includes:

an interior surface on said socket dimensioned to partially receive said ball, said socket attached to said first clamp, said socket further including an end wall; and a generally hemispherical protrusion surrounding a portion of said ball and attached to said second clamp, said generally hemispherical protrusion having an end wall, said end wall of said protrusion facing said end wall of said socket.

18. The swivel clamp of claim 17 wherein said end wall of said socket and said end wall of said protrusion are spaced from each other and the spacing between the end walls changes when said first and second clamps are swiveled with respect to each other.

19. The swivel clamp of claim 18 wherein said end walls of said socket and said protrusion limit the extent of swiveling of said first and second clamps.

20. The swivel clamp of claim 19 wherein said socket and said protrusion include generally hemispherical exterior surfaces which are contacted by said third clamp when said top and bottom of said third clamp are tightly fastened together.

21. The swivel clamp of claim 17 wherein said ball is fixedly attached to said generally hemispherical protrusion.

22. The swivel clamp of claim 1 wherein said attachment structures of said first and second clamps are openings defined in said first and second clamps for receiving the first and second parts, respectively.

* * * * *